United States Patent
Chen et al.

(10) Patent No.: US 9,321,250 B2
(45) Date of Patent: Apr. 26, 2016

(54) SELECTIVELY PERMEABLE PROTECTIVE STRUCTURE AND ARTICLES THEREFROM

(75) Inventors: John Chu Chen, Hockessin, DE (US); Donna Lynn Visioli, Lower Gwynedd, PA (US)

(73) Assignee: E.I. DU PONT DE NEMOURS AND COMPANY, Wilmington, DE (US)

( * ) Notice: Subject to any disclaimer, the term of this patent is extended or adjusted under 35 U.S.C. 154(b) by 1584 days.

(21) Appl. No.: 12/762,706

(22) Filed: Apr. 19, 2010

(65) Prior Publication Data

US 2010/0273380 A1   Oct. 28, 2010

Related U.S. Application Data

(60) Provisional application No. 61/172,036, filed on Apr. 23, 2009, provisional application No. 61/237,789, filed on Aug. 28, 2009.

(51) Int. Cl.

| | |
|---|---|
| *B32B 27/12* | (2006.01) |
| *B32B 27/32* | (2006.01) |
| *C08L 23/08* | (2006.01) |
| *B32B 5/02* | (2006.01) |
| *B32B 5/08* | (2006.01) |
| *B32B 27/06* | (2006.01) |
| *B32B 27/08* | (2006.01) |
| *B32B 27/10* | (2006.01) |
| *B32B 27/18* | (2006.01) |
| *B32B 27/20* | (2006.01) |
| *B32B 27/30* | (2006.01) |
| *B32B 27/36* | (2006.01) |
| *B32B 3/26* | (2006.01) |

(52) U.S. Cl.
CPC .................. *B32B 27/32* (2013.01); *B32B 3/266* (2013.01); *B32B 5/022* (2013.01); *B32B 5/024* (2013.01); *B32B 5/026* (2013.01); *B32B 5/08* (2013.01); *B32B 27/06* (2013.01); *B32B 27/08* (2013.01); *B32B 27/10* (2013.01); *B32B 27/12* (2013.01); *B32B 27/18* (2013.01); *B32B 27/20* (2013.01); *B32B 27/304* (2013.01); *B32B 27/306* (2013.01); *B32B 27/308* (2013.01); *B32B 27/322* (2013.01); *B32B 27/327* (2013.01); *B32B 27/36* (2013.01); *C08L 23/0869* (2013.01); *C08L 23/0876* (2013.01); *B32B 2250/42* (2013.01); *B32B 2260/021* (2013.01); *B32B 2260/046* (2013.01); *B32B 2262/02* (2013.01); *B32B 2262/0253* (2013.01); *B32B 2262/0261* (2013.01); *B32B 2262/0269* (2013.01); *B32B 2262/0276* (2013.01); *B32B 2262/06* (2013.01); *B32B 2262/062* (2013.01); *B32B 2262/08* (2013.01); *B32B 2262/101* (2013.01); *B32B 2262/106* (2013.01); *B32B 2262/14* (2013.01); *B32B 2264/102* (2013.01); *B32B 2264/104* (2013.01); *B32B 2264/108* (2013.01); *B32B 2270/00* (2013.01); *B32B 2307/304* (2013.01); *B32B 2307/406* (2013.01); *B32B 2307/412* (2013.01); *B32B 2307/50* (2013.01); *B32B 2307/54* (2013.01); *B32B 2307/546* (2013.01); *B32B 2307/554* (2013.01); *B32B 2307/558* (2013.01); *B32B 2307/584* (2013.01); *B32B 2307/5825* (2013.01); *B32B 2307/72* (2013.01); *B32B 2307/724* (2013.01); *B32B 2307/7265* (2013.01); *B32B 2307/75* (2013.01); *B32B 2437/00* (2013.01); *B32B 2553/00* (2013.01); *B32B 2571/00* (2013.01); *Y10T 428/249921* (2015.04); *Y10T 428/249993* (2015.04); *Y10T 428/2933* (2015.01); *Y10T 428/31902* (2015.04); *Y10T 442/20* (2015.04); *Y10T 442/2902* (2015.04)

(58) Field of Classification Search
CPC ............ C08L 2666/06; C08L 23/0869; C08L 23/0876
USPC ............... 428/411.1, 511, 522, 535; 156/190; 427/398.1
See application file for complete search history.

(56) References Cited

U.S. PATENT DOCUMENTS

| | | |
|---|---|---|
| 6,579,948 B1 | 6/2003 | Tan |
| 6,645,336 B1 | 11/2003 | Albertone |
| RE38,429 E | 2/2004 | Eichbauer |
| 6,808,772 B2 | 10/2004 | Kunzel |
| 6,878,455 B2 | 4/2005 | Kunzel |
| 6,890,666 B2 | 5/2005 | Kunzel |
| 7,285,324 B1 | 10/2007 | Albertone |
| 7,514,380 B2 | 4/2009 | Chen |
| 2003/0198715 A1 | 10/2003 | Morris |
| 2003/0215609 A1 | 11/2003 | Burkart |
| 2004/0103603 A1 | 6/2004 | Kunzel |
| 2004/0103604 A1 | 6/2004 | Kunzel |
| 2004/0103607 A1 | 6/2004 | Kunzel |
| 2004/0245391 A1 | 12/2004 | Kunzel |
| 2007/0283652 A1 | 12/2007 | Chen |
| 2007/0287019 A1* | 12/2007 | Chen et al. .................... 428/511 |
| 2008/0176468 A1* | 7/2008 | Chen ................................ 442/1 |

FOREIGN PATENT DOCUMENTS

| | | |
|---|---|---|
| WO | 2004043155 A2 | 5/2004 |
| WO | 2005056669 A1 | 6/2005 |
| WO | 2008082624 A2 | 7/2008 |

\* cited by examiner

*Primary Examiner* — Peter Y Choi
*Assistant Examiner* — Vincent A Tatesure

(57) ABSTRACT

A selectively permeable protective structure and a method for limiting damage to the article due to corrosion or mold growth, comprising wrapping or covering the article in the selectively permeable protective structure. The selectively permeable structure comprises a membrane having a moisture vapor permeation value of at least 200 g-mil/m²/24 h and barrier to liquid water, and optionally a supporting substrate.

20 Claims, No Drawings

SELECTIVELY PERMEABLE PROTECTIVE STRUCTURE AND ARTICLES THEREFROM

This application claims priority to U.S. provisional application 61/172,036, filed Apr. 23, 2009 and U.S. provisional application 61/237,789, filed Aug. 28, 2009; the entire disclosures of which are incorporated herein by reference.

This invention relates to a selectively permeable composition and structure having high moisture vapor permeability and low permeability to others such as chemicals and to articles made therefrom.

BACKGROUND

Personal protection from exposure to harmful chemical and biological agents is often of concern to firefighters, medical practitioners and similarly situated personnel. Such protection often includes the use of apparel that provides a barrier to such agents. Butyl rubber is often used in standard protective clothing. However, garments made from butyl rubber are bulky and nearly impermeable to air and moisture (I. Lee, Yang and Wilusz; Polymer Engineering & Science, 1996, 36, 1217) resulting in unbearable levels of heat inside the garments during use. Other protective apparel includes textiles coated with polymeric materials to provide a chemical and/or biological barrier.

Various permeable materials having a wide range of mechanical and transport properties are known. Depending upon the particular application in which the permeable material is to be employed, however, certain combinations of properties are required. For example, in a protective apparel application, it is desirable that the material may transport water vapor and block the transport of harmful chemicals and/or biological agents, and be lightweight and flexible over a broad temperature range. A need exists for a material that can be a flexible, solid material with membrane characteristics that facilitate the transport of water vapor, for example, from a wearer of membrane-containing apparel to the atmosphere; allow moisture to permeate the garments to the extent necessary to afford comfort to the wearer, thus reducing heat stress; and block entry of certain chemical compounds and biological agents.

Equipment is often wrapped or packaged with film or fabric tarpaulins, hoods or other covers to prevent surface damage during transportation and storage. These covers may be prepared from high barrier (highly moisture impermeable) films and fabrics (see, e.g., http://www.heritagepackaging.com/productservices/barrierpackaging/bpbasics/bp basics.htm).

Many relatively small items are shipped on pallets, that is, platforms that are easily moved by forklifts or small cranes. Pallets provide convenience in loading and unloading goods from shipping containers, and in moving smaller amounts of goods over shorter distances, such as within warehouses, or to deliver a retail quantity. The small items may be unpackaged or packaged, for example in bags or boxes, when they are placed on the pallets.

A loaded pallet preferably has integrity and stability, so that the goods are not damaged or lost during shipping. To provide the necessary integrity and stability, the pallet and its load have been typically wrapped together in film, for example overlapping layers of polyethylene stretch wrap that may be applied by machine or by hand. See, e.g., US RE38429. Other generally practiced methods of providing integrity and stability to loaded pallets include wrapping the pallet and its load in heat shrinkable film, encasing the loaded pallet in a sheath or "hood" which may be heat shrinkable or stretchable, and containing the goods in a single carton or box. These methods are sometimes referred to, individually or collectively, as "pallet unitizing".

Using barrier films for wrapping small objects or articles in sealed bags is generally suitable since the object may be dried before being sealed in the bags and/or drying agents may be included inside the sealed bags. This approach is less suitable for large objects such as vehicles, boats, motors, machinery, industrial goods, pallets or containers holding smaller articles, and other bulky equipment because the covers are typically not hermetically sealed around the object and thorough drying of the object may not be feasible. This may be especially problematic during storage or when shipping by ship or railroad, because the large objects may be exposed to adverse weather conditions for long periods of time. Atmospheric moisture and/or rain may enter the space under the cover and be trapped and condense. With high barrier covers, there is no way for water to permeate back outside the cover, resulting in a buildup of moisture inside the cover, leading to the possibility of corrosion.

Large amounts of money are lost each year because of corrosion of, for example, iron, steel, and other metals. There are many factors affecting corrosion rate including moisture, oxygen, and salt presence. A common corrosion occurs due to electrochemical reactions at high humidity conditions. For example, when iron is exposed to moist air, it reacts with oxygen to form rust (iron oxide). The result of corrosion may be the formation of metal oxide that flakes off easily, causing extensive pitting thereby causing structural weakness and disintegration of the metal. Corrosion can also affect other properties of metal parts such as reducing conductivity or increasing surface roughness so that moving parts become unable to move freely.

In addition to corrosion of metals, mold growth may occur in the condensed moisture on the surface of the equipment.

Using a film or cover with a high water vapor transmission rate can prevent condensation of water inside the cover by allowing equilibration of the trapped moisture back into the surrounding atmosphere. Using such a film prevents or reduces rust formation and corrosion and reduces the opportunity for mold growth.

Various references describe semipermeable materials produced from a variety of polymers that may be useful for protective covers. See e.g., U.S. Pat. No. 6,579,948. Recently protective fabrics comprising a selectively permeable membrane comprising organic acid-modified ionomer compositions have been disclosed (U.S. Pat. No. 7,514,380).

Many previous permeable membranes are microporous (i.e., permeable due to the presence of microscopic pores through which vapor can pass). Microporous membranes, which may be laminated on or between nonwoven textiles, have increased permeability, but may not provide adequate barriers to liquids because of their nonselective permeability. Liquids under pressure may be able to penetrate the pores. Most microporous films are biaxially oriented, so only a small amount of shrinkage is possible, and they cannot be shrunk without losing their porosity. They may also have low tear strength and their surfaces may be easily fouled, thereby losing permeability.

Recently protective fabrics comprising a selectively permeable membrane comprising organic acid-modified ionomer compositions have been disclosed (U.S. Pat. No. 7,514,380). Although compositions disclosed therein provide excellent selective permeability, adhesion to certain nonwoven textiles may be insufficient to provide a robust protective garment.

Because no single material has emerged which satisfies all of the technical requirements and that presents a cost-effective alternative, it is desirable to provide a selectively permeable membrane or structure or layer that displays a combination of mechanical properties, low temperature flexibility, selective transport, ease of processability, and cost-effectiveness, so as to render it suitable for use as a protective cover for objects that limits corrosion and/or mold growth.

SUMMARY OF THE INVENTION

This invention provides a selectively permeable structure or article comprising or consisting essentially of a composition comprising or consisting essentially of (a) a combination comprising, consisting essentially of, or consisting of (i) and (ii), wherein (i) is one or more ethylene acid copolymers; and (ii) is one or more organic acids; wherein at least 50% of the combined acidic groups in the acid copolymer and the organic acid are nominally neutralized to salts with metal ions and at least 50% of the metal ions are alkali metal ions;

(b) a terpolymer of ethylene, acrylic acid or methacrylic acid, and an alkyl acrylate or alkyl methacrylate; and (c) optionally one or more ethylene-containing polymers selected from the group consisting of polyethylene (PE) homopolymers, copolymers of ethylene and an α-olefin, copolymers of ethylene and a diolefin, and ethylene copolymers obtained from copolymerization of ethylene with at least one polar monomer selected from the group consisting of vinyl acetate, acrylic ester, methacrylic ester and carbon monoxide, wherein the ethylene-containing polymer does not comprise a carboxylic acid comonomer.

The selectively permeable structure can be used as a protective article. Notably, the composition has a moisture vapor permeation value (MVPV) of at least 200 g-mil/m$^2$/24 h and high water-entry pressure; and the selectively permeable structure has a moisture vapor transmission rate (MVTR) of at least 30 g/m$^2$/24 h. The MVPV and MVTR are measured at 37.8° C. and 100% relative humidity according to ASTM F-1249.

An article that can provide a permeable protective structure or article comprises, consists essentially of, consists of, or is produced from, a substrate and a selectively permeable membrane wherein the article is selectively permeable to moisture and can have a moisture vapor transmission rate (MVTR) measured according to ASTM F2298 of at least 1800 g/m$^2$/24 h;

the substrate comprises a textile or a porous sheet material; and the membrane can comprise, consist essentially of, consist of, or be produced from the composition disclosed above.

A method for limiting damage to an article due to corrosion or mold growth, comprising wrapping or covering the article in a selectively permeable protective structure wherein the structure can be the same as those disclosed above.

DETAILED DESCRIPTION OF THE INVENTION

The entire disclosures of all references are incorporated herein by reference and tradenames or trade marks are shown in upper case. The word(s) following the verb "is" can be a definition of the subject.

"(Meth)acrylic acid" includes methacrylic acid and/or acrylic acid and "(meth)acrylate" includes methacrylate and/or acrylate.

"Selectively permeable" means permeation is allowed only to certain molecules in a specific state such as vapor or gas and not to other molecules or in a different state such as liquid or solid. Such molecules can be dissolved or dispersed in the matrix of certain materials such as a film or sheet of the composition disclosed herein and thereafter be diffused or migrated through the material.

The selectively permeable composition may have MVPV of at least 200, at least 800, at least 900, at least 1200, at least 2000, at least 4,000 g-mil/m$^2$/24 h, or even higher. MVPV is an indicator of the inherent permeability of the composition, by measuring moisture permeation of a membrane comprising the composition, which may be a film or sheet that is normalized to 1 mil thickness.

Selectively permeable protective articles may have MVTR of at least 30, at least 50, at least 100, at least 500, or at least 1000 g/m$^2$/24 h, or even higher. MVTR measures total moisture vapor transmitted through an article across its smallest dimension during a unit time, disregarding the structure thickness. For a membrane of a given composition and MVPV, MVTR decreases as the thickness increases.

A selectively permeable article provides a combination of mechanical properties, low temperature flexibility, selective transport, ease of processability, and cost-effectiveness.

Extrusion coating a selectively permeable composition comprising an organic acid modified-ionomer composition, as disclosed in U.S. Pat. No. 7,514,380, onto substrates such as paper or fabrics has experienced poor adhesion of the composition to the substrate. Previously, inclusion of 20 to 30 weight % of ethylene alkyl (meth)acrylate copolymers have been used to improve adhesion of other selectively permeable compositions (e.g., copolyester amide copolymers [PEBAX®]) to substrates. While improving adhesion, the ethylene alkyl (meth)acrylate copolymers may have a negative effect on the moisture breathability of the coating.

Surprisingly, an ethylene acrylic acid alkyl (meth)acrylate terpolymer (e.g., ethylene (meth)acrylic acid n-butyl acrylate terpolymer) can be effective in promoting the adhesion of organic acid-modified ionomer to fabrics under relatively mild processing conditions. At 10 weight % level (versus a typical modification level of 30 weight % for ethylene alkyl acrylate dipolymers) such a terpolymer demonstrated enhanced fabric adhesion, while adequately retaining the moisture permeability of the original organic acid modified ionomer.

The composition can be formed into a monolithic or continuous membrane that functions as a selectively permeable barrier. Monolithic continuous membranes, in contrast to microporous membranes, have high water-entry pressure and are waterproof and liquid proof. High water-entry pressure refers to >150 cm (or >250 cm or >500 cm) H$_2$O hydrostatic head, as described in DIN EN20811:92.

Therefore, monolithic membranes provide barriers to liquids such as water, while still allowing permeability to water vapor under appropriate conditions. A monolithic barrier is also effective at preventing exposure to liquids such as water, solvents, oils, corrosive fluids and the like, or particulates or solids, including dust, irritants, mold spores, allergens, pollen, animal dander, hair and the like.

The selectively permeable membrane may be selective to liquid penetrants depending on the size and polarity of the penetrants, i.e., has selectivity so as to be capable of allowing water to diffuse through at a higher rate than virtually all organic liquids having a molecular weight higher than that of methanol.

The acid copolymers are preferably "direct" or "random" acid copolymers. Direct or random copolymers are polymers polymerized by adding all monomers simultaneously, as distinct from a graft copolymer, where another monomer is grafted onto an existing polymer, often by a subsequent free radical reaction.

The one or more ethylene acid copolymers may comprise an E/W ethylene acid copolymer wherein E represents copolymerized units of ethylene, W is present in about 2 to about 35 weight % of the copolymer and represents copolymerized units of at least one $C_3$ to $C_8$ $\alpha,\beta$-ethylenically unsaturated carboxylic acid, and ethylene can make up the rest.

W can be from about 3 to 35, 4 to 25, or 5 to 20, weight % of the E/W copolymer. Examples of W include acrylic acid or methacrylic acid. Specific acid copolymers include ethylene/acrylic acid dipolymers and ethylene/methacrylic acid dipolymers. An ethylene/methacrylic acid dipolymer of note comprises 19 weight % of copolymerized units of methacrylic acid.

Ethylene acid copolymers may be produced by any methods known to one skilled in the art such as use of "co-solvent technology" disclosed in U.S. Pat. No. 5,028,674.

Ionomers are obtained by neutralization of an acid copolymer. Neutralizing agents including metal cations such as sodium or potassium ions are used to neutralize at least some portion of the acidic groups in the acid copolymer. Unmodified ionomers are prepared from the acid copolymers such as those disclosed in U.S. Pat. No. 3,264,272. "Unmodified" refers to ionomers that are not blended with any material that has an effect on the properties of the unblended ionomer. The acid copolymers may be used to prepare unmodified, melt processable ionomers by treatment with a metal compound. The unmodified ionomers may be nominally neutralized to any level such as about 15 to about 90% or about 40 to about 75% of the acid moieties.

The organic acids may be monobasic, having fewer than 36 carbon atoms, or salts thereof. The acids are optionally substituted with from one to three substituents independently selected from the group consisting of $C_1$-$C_8$ alkyl, OH, and $OR^1$ in which each $R^1$ is independently $C_1$-$C_8$ alkyl, $C_1$-$C_6$ alkoxyalkyl or $COR^2$; and each $R^2$ is $C_1$-$C_8$ alkyl.

Examples of organic acids include $C_4$ to $C_{36}$ (such as $C_{34}$, $C_{4-26}$, $C_{6-22}$, or $C_{12-22}$) acids. At high neutralization such as greater than 80%, up to 100%, nominal neutralization (i.e., sufficient metal compound is added such that all acid residues in the copolymer and organic acid are nominally neutralized), volatility is not an issue and organic acids with lower carbon content may be used, though it is preferred that the organic acid (or salt) be non-volatile (not volatilize at temperatures of melt blending of the agent with the acid copolymer) and non-migratory (not bloom to the surface of the polymer under normal storage conditions (ambient temperatures)). Examples of organic acids include, but are not limited to, caproic acid, caprylic acid, capric acid, lauric acid, stearic acid, isostearic acid, arachidic acid, behenic acid, erucic acid, oleic acid, and linoleic acid. Organic (fatty) acids include palmitic acid, stearic acid, oleic acid, erucic acid, behenic acid, isostearic acid, 12-hydroxystearic acid, or combinations of two or more thereof. Saturated organic acids, such as stearic acid, arachidic acid, and behenic acid, may be preferred.

Organic acids may be commercially available as a mixture of named organic acid(s) and a number of structurally different organic acids of varying lesser amounts. When a composition comprises a named acid, other unnamed acids may be present at levels conventionally known to be present in commercial supplies of the named acid. For example, a commercially available mixture of acids includes 90 weight % of a mixture of arachidic acid ($C_{20}$ acid) and behenic acid ($C_{22}$ acid) with 6 weight % of $C_{18}$ acids and 4 weight % of other acids.

Salts of any of these organic acids may include the alkali metal salts, such that the metal ions present in the final composition comprise at least 50% of alkali metal ions, including lithium, sodium, potassium salts and/or cesium salts, preferably sodium salts or potassium salts.

The amount of basic metal compound capable of neutralizing acidic groups may be provided by adding the stoichiometric amount of the basic compound calculated to neutralize a target amount of acid moieties in the acid copolymer and organic acid(s) in the blend (herein referred to as "% nominal neutralization" or "nominally neutralized"). Thus, sufficient basic compound is made available in the blend so that, in aggregate, the indicated level of nominal neutralization could be achieved. Greater than 50%, 60%, 70%, 80% or 90% (or even 100%) of the total acidic groups in the E/W copolymers and organic acids may be nominally neutralized with metal ions; and the metal ions comprise at least 50 mole % alkali metal ions, preferably sodium or potassium. Small amounts of salts of alkaline earth metal and/or transition metal ions may be present in addition to the alkali metals.

Metal compounds may include compounds of alkali metals, such as lithium, sodium, potassium, or cesium or combinations of such cations. Examples include sodium, potassium, cesium or any combination of sodium, potassium, and/or cesium, optionally including small amounts of other cations such as other alkali metal ions, transition metal ions or alkaline earth ions. Metal compounds of note include formates, acetates, nitrates, carbonates, hydrogencarbonates, oxides, hydroxides or alkoxides of the ions of alkali metals, especially sodium and potassium, and formates, acetates, nitrates, oxides, hydroxides or alkoxides of the ions of alkaline earth metals and transition metals. Of note are sodium hydroxide, potassium hydroxide, sodium acetate, potassium acetate, sodium carbonate and potassium carbonate.

The ethylene acid copolymers or unmodified ionomers may be mixed with organic acids or salts thereof and/or metal compounds, by any means known to one skilled in the art, to prepare a blended modified ionomer composition comprising (1) and (2) as described above. It is substantially melt-processable and may be produced by combining one or more ethylene acid copolymers, one or more monobasic carboxylic acids or salts thereof, basic compound(s) to form a mixture; and heating the mixture under a condition sufficient to produce the composition. Heating may be carried out under a temperature in the range of from about 80 to about 350, about 100 to about 320, or 120 to 300° C. under a pressure that accommodates the temperature for a period from about 30 seconds to about 2 or 3 hours. For example, the composition may be produced by melt-blending an acid copolymer and/or ionomer thereof with one or more organic acids or salts thereof; concurrently or subsequently combining a sufficient amount of a basic metal compound capable of neutralization of the acid moieties to nominal neutralization levels greater than 50, 60, 70, 80, 90%, to near 100%, or to 100%. A salt-and-pepper blend of components may be heated or the components may be melt-blended in an extruder. For example, a twin-screw extruder may be used to mix and treat the acid copolymer and the organic acid (or salt) with the metal compound at the same time. It is desirable that the blending is conducted so that the components are intimately mixed, allowing the basic metal compound to neutralize the acidic moieties.

Treatment of acid copolymers and organic acids with metal compounds in this manner (concurrently or subsequently), such as without the use of an inert diluent, may produce a composition without loss of processability or properties such as toughness and elongation to a level higher than that which would result in loss of melt processability and properties for the ionomer alone.

The organic acid-modified ionomer is melt blended with an E/X/Y ethylene acid terpolymer and optionally a second ethylene-containing polymer as defined above.

The ethylene acid terpolymers are preferably direct or random acid copolymers. The ethylene acid terpolymer component comprises one or more E/X/Y terpolymers where E represents copolymerized units of ethylene, X represents copolymerized units of at least one $C_3$-$C_8$ $\alpha,\beta$-ethylenically unsaturated carboxylic acid, Y represents copolymerized units of a softening comonomer (softening means that the polymer is made less crystalline).

Examples of X include acrylic acid or methacrylic acid and X can be from about 3 to 35, 4 to 25, or 5 to 20, weight % of the E/X/Y copolymer and ethylene can make up the rest. Examples of Y include alkyl acrylate, alkyl methacrylate, or combinations thereof wherein the alkyl groups have from 1 to 8, or 1 to 4, carbon atoms. Notable are E/X/Y copolymers wherein Y is present in at least 1 weight %, or about 2 to about 35 weight % of the E/X/Y copolymer. Ethylene can make up the rest of the E/X/Y terpolymer.

Specific terpolymers include ethylene/acrylic acid/n-butyl acrylate, ethylene/methacrylic acid/n-butyl methacrylate, ethylene/acrylic acid/iso-butyl acrylate, ethylene/methacrylic acid/iso-butyl methacrylate, ethylene/acrylic acid/methyl acrylate, ethylene/methacrylic acid/methyl methacrylate, ethylene/acrylic acid/ethyl acrylate and ethylene/methacrylic acid/ethyl methacrylate terpolymers, or combinations of two or more thereof.

Preferably, the modified ionomer combination of (1) and (2) is prepared and subsequently blended with the E/X/Y terpolymer. Blending the E/X/Y terpolymer with the E/W dipolymer prior to, or simultaneously with, conversion of the E/W dipolymer to the organic acid-modified ionomer may result in a composition in which improved adhesion to substrates is not observed.

Optionally, an additional ethylene-containing polymer may be blended with the organic acid-modified ionomer and E/X/Y terpolymer. Blending with such polymers may provide better processability, improved toughness, strength, flexibility, and/or compatibility of the blend when adhering to a substrate as described below. The compositions may comprise 0 to 60 weight %, preferably 0 to 30 weight % of the additional ethylene-containing polymer, such as 0.1 to 60 weight % or 0.1 to 30 weight %.

The ethylene-containing polymers may include polyethylene (PE) homopolymers and copolymers. PE homopolymers and copolymers may be prepared by a variety of methods, for example, the well-known Ziegler-Natta catalyst polymerization (e.g., U.S. Pat. No. 4,076,698 and U.S. Pat. No. 3,645,992), metallocene catalyzed polymerization, VERSIPOL catalyzed polymerization and by free radical polymerization. The polymerization may be conducted as solution phase processes, gas phase processes, and the like. Examples of PE polymers may include high density PE (HDPE), linear low density PE (LLDPE), low density PE (LDPE), very low or ultralow density PEs (VLDPE or ULDPE), lower density PE made with metallocene having high flexibility and low crystallinity (mPE). Metallocene technology is described in, for example, U.S. Pat. Nos. 5,272,236, 5,278,272, 5,507,475, 5,264,405, and 5,240,894.

The density of PE may range from about 0.865 g/cc to about 0.970 g/cc. Linear PE may incorporate $\alpha$-olefin comonomers such as butene, hexene or octene to decrease density to within the density range so described. For example, a copolymer may comprise a major portion (by weight) of ethylene that is copolymerized with another $\alpha$-olefin having 3-20 carbon atoms and up to about 20% by weight of the copolymer. Other $\alpha$-olefins are propylene, 1-butene, 1-hexene, 4-methyl-1-pentene, 1-octene, 1-decene, 1-tetradecene, 1-octadecene, or in combinations of two or more. Of note are metallocene polyethylenes comprising ethylene/octene copolymers.

The PE copolymer may also be an ethylene propylene elastomer containing a small amount of unsaturated compounds having a double bond. The term "PE" when used herein is used generically to refer to any or all of the polymers comprising ethylene described above.

Ethylene copolymers having small amounts of a diolefin component such as butadiene, norbornadiene, hexadiene and isoprene are also generally suitable. Terpolymers such as ethylene/propylene/diene monomer (EPDM) are also suitable.

The ethylene-containing polymer may include ethylene copolymers obtained from copolymerization of ethylene with at least one polar monomer such as ethylene/vinyl acetate copolymer (EVA), ethylene/acrylic ester copolymers, ethylene/methacrylic ester copolymers, ethylene/vinyl acetate/CO copolymers, ethylene/acrylic ester/CO copolymers, and/or mixtures of any of these.

EVA includes copolymers derived from the copolymerization of ethylene and vinyl acetate or the copolymerization of ethylene, vinyl acetate, and an additional comonomer. The vinyl acetate comonomer may have 2 to 45 or 6 to 30 weight % derived from vinyl acetate. An EVA may have a melt flow rate, measured in accordance with ASTM D-1238, of from 0.1 to 60 g/10 or 0.3 to 30 g/10 minutes. A mixture of two or more different EVAs may be used.

Ethylene/alkyl (meth)acrylate copolymer includes copolymers of ethylene and one or more $C_{1-8}$ alkyl (meth)acrylates. Examples of alkyl (meth)acrylates include methyl acrylate, ethyl acrylate and butyl acrylate. Examples of the copolymers include ethylene/methyl acrylate copolymer ethylene/ethyl acrylate copolymer, ethylene/butyl acrylate copolymer, or combinations of two or more thereof. Alkyl (meth)acrylate may be incorporated into an ethylene/alkyl (meth)acrylate copolymer at 2 to 45, 5 to 45, 10 to 35, or 10 to 28 weight %.

Ethylene/alkyl (meth)acrylate copolymers may be prepared by processes well known to one skilled in the art using either autoclave or tubular reactors. See, e.g., U.S. Pat. Nos. 2,897,183, 3,404,134, 5,028,674, 6,500,888, and 6,518,365. Because the methods for making an ethylene/alkyl (meth)acrylate copolymer are well known, the description of which is omitted herein for the interest of brevity. Tubular reactor produced ethylene/alkyl (meth)acrylate copolymers are commercially available from E. I. du Pont de Nemours and Company, Wilmington, Del. (DuPont) such as ELVALOY® AC. The ethylene/alkyl (meth)acrylate copolymers may vary significantly in molecular weight and the selection of the melt index (MI) grade of polymer may be made by balancing the properties of the ethylene/alkyl (meth)acrylate copolymer with those of the neutralized organic acid and ethylene acid copolymer to provide the desired mix of permeability and structural properties needed for a specific variable permeability construction. A mixture of two or more different ethylene/alkyl (meth)acrylate copolymers may be used. Of note is the method wherein the second composition has at least one ethylene/alkyl (meth)acrylate copolymer present in from 5 to 30 weight %.

Preferably, the modified ionomer combination of (1) and (2) is prepared and subsequently blended with the E/X/Y terpolymer and the optional ethylene-containing polymer. However, in some embodiments the ethylene-containing polymer may be melt blended with the components of the organic acid-modified ionomer during its preparation or prior to blending with the E/X/Y terpolymer. That is, blending with the ethylene-containing polymer and neutralization of the E/W dipolymer and organic acid and may be conducted simultaneously in a single process operation.

In other embodiments the modified ionomer combination of (1) and (2) may be prepared, melt blended with the ethylene-containing polymer and then melt blended with the ethylene acid terpolymer. For example, a salt-and-pepper blend of the organic acid-modified ionomer and the ethylene-containing polymer may be heated above their melting temperatures and mixed or the components may be melt-blended in an extruder. The resulting composition may be collected, for example as pellets, and subsequently blended with the E/X/Y terpolymer.

In other embodiments the organic acid-modified ionomer may be prepared and melt blended with the ethylene-containing polymer and the ethylene acid terpolymer at the same time, that is, in a single process operation. A salt-and-pepper blend of the organic acid-modified ionomer, the ethylene-containing polymer and the ethylene acid terpolymer may be heated above their melting temperatures and mixed or the components may be melt-blended in an extruder, either after pre-blending a pellet blend or by feeding the components to the extruder in metered amounts.

When blending polymeric resins the higher flow or lower viscosity resin tends to flow more readily relative to other lower flow resins. This melt rheology effect tends to facilitate the higher flow resin to disperse and distribute more effectively in the blend during the melt blending process and enable more effective distribution at the interface with higher melt shear field. Depending on the blending and extrusion conditions, the ethylene-containing polymer and the E/X/Y terpolymer components may be concentrated near the surface of the extrudate, providing improved adhesion to the substrate.

An embodiment is one in which the composition comprises, consists essentially of, or consists of (a) 30 to 99 weight %, based on the combination of (a), (b) and (c), of a blended combination of (1) 70 to 90 weight %, based on the combination of (1) and (2), of one or more E/W ethylene acid copolymers or ionomers of the acid copolymers wherein E represents copolymerized units of ethylene, W is present in about 2 to about 35 weight % of the copolymer and represents copolymerized units of at least one $C_3$ to $C_8$ $\alpha,\beta$-ethylenically unsaturated carboxylic acid;

(2) 10 to 30 weight %, based on the combination of (1) and (2), of one or more organic acids having from 4 to 36 carbon atoms, or salts thereof; wherein at least 50% of the combined acidic groups in the E/W copolymer and the organic acid are nominally neutralized to salts with metal ions; wherein at least 50% of the metal ions are alkali metal ions;

(b) 1 to 30 weight %, based on the combination of (a), (b) and (c), of E/X/Y ethylene acid terpolymers wherein E represents copolymerized units of ethylene, X is present in about 2 to about 35 weight % of the copolymer and represents copolymerized units of at least one $C_3$ to $C_8$ $\alpha,\beta$-ethylenically unsaturated carboxylic acid, and Y is present in about 1 to about 35 weight % of the copolymer and represents copolymerized units of alkyl acrylate or alkyl methacrylate; wherein (a), (b) and (c) total 100 weight %; and (c) 0 to 60 weight %, based on the combination of (a), (b) and (c), of one or more second ethylene-containing polymer selected from the group consisting of polyethylene homopolymers, copolymers of ethylene and an α-olefin, copolymers of ethylene and a diolefin, and ethylene copolymers obtained from copolymerization of ethylene with at least one polar monomer selected from the group consisting of vinyl acetate, acrylic ester, methacrylic ester and carbon monoxide, wherein the second ethylene-containing polymer does not comprise an unsaturated carboxylic acid comonomer.

The composition may additionally comprise from 0.01 to 15, 0.01 to 10, or 0.01 to 5, weight %, based on the total composition weight, of additives including plasticizers, stabilizers including viscosity stabilizers and hydrolytic stabilizers, primary and secondary antioxidants, ultraviolet ray absorbers, anti-static agents, dyes, pigments or other coloring agents, inorganic fillers, fire-retardants, lubricants, reinforcing agents such as glass fiber and flakes, synthetic (for example, aramid) fiber or pulp, foaming or blowing agents, processing aids, slip additives, antiblock agents such as silica or talc, release agents, tackifying resins, or combinations of two or more thereof. These additives are described in the Kirk Othmer *Encyclopedia of Chemical Technology*.

The additives may be incorporated into the composition by any known process such as by dry blending, extruding a mixture of the various constituents, the conventional masterbatch technique, or the like.

The composition can further comprise a fire retardant such as a chemical additive including, but not limited to, phosphorous compounds, antimony oxides, and halogen compounds, particularly bromine compounds, and others well known in the art. A loading of such additives can be between 20 to 30, or about 25% (of the final air-dried composition or air-dried film weight).

The composition may also comprise fillers, fibers, or pulps in added quantities that may be up to 30 to 40 weight % of the total composition. These materials may provide reinforcement or otherwise modify the mechanical properties of the composition, without negatively impacting the selective permeability of the composition. Fillers include, for example, inorganic materials such as carbon black, $TiO_2$, calcium carbonate ($CaCO_3$). Fibers, including chopped fibers, include glass fibers, aramid fibers, carbon fibers and the like. Pulps include, for example aramid micropulps (micropulp has a volume average length from about 0.01 to about 100 micrometers).

The polymer composition can be formed or incorporated into a film or sheet. Films may be made by known techniques such as casting the polymer composition onto a flat surface or into a film, extruding the molten polymer composition through an extruder to form a cast film, or extruding and blowing the polymer composition film to form an extruded blown film.

The films may have a thickness of from 1 to 2500 μm, with the preferred thickness for many protective cover applications being about 5 to 10 mils thick, or about 120 to 250 μm thick.

The protective structures can be in the form of, for example, tarpaulins, covers, garments and the like. The membrane from the composition can be present as a layer of material added to the protective structure, or as one component of a fabric incorporated into the protective structure. Generally, a layer of the composition and a supporting substrate, as described in greater detail below, may be arranged in overlaying or overlapping fashion to provide a protective structure. When used with a substrate, the selectively permeable composition may have a thickness from about 10 to about 250 μm. The membrane composition can be converted and applied to a substrate by a variety of techniques and processes.

The composition may be applied to a substrate in molten condition by, for example but not limitation, extrusion coating to a substrate or lamination of two substrate layers by means of an inner layer of the composition applied in molten form to adhere the substrates together. In some embodiments the polymer composition can be coated directly on a substrate utilizing fabric impregnation and coating techniques. For example, the selectively permeable composition is a coating applied directly on the substrate (via extrusion coating, spraying, painting or other appropriate application methods). Such coating can be applied using spreading methods known in the art such as with a rubber doctor blade or with a slit extrusion machine.

The composition can be applied to one side or both sides of a textile substrate. In the case where the substrate is coated or laminated on one side, the composition may be applied to the side that is directly exposed to the environment to provide a liquid-impermeable outer surface. Alternatively, in applications where mechanical wear or abrasion is likely, the composition may be applied to the side of the textile substrate opposite the side exposed to the mechanical wear to afford protection of the polymeric composition.

In other embodiments the composition can be impregnated in a substrate or the substrate can be impregnated in the polymer.

The selectively permeable composition may be formed at least partially in the substrate by impregnating the substrate with the composition by applying the molten composition to the substrate and then cooling the composition while it is in contact with the pores of the substrate.

The composition can be dispersed throughout the substrate such as a loosely woven fabric where the composition fills gaps in the substrate and does not just adhere on the surface of a substrate. The substrate can be impregnated inside the selectively permeable membrane through lamination or coextrusion process to have the permeable compositions on both sides of the substrate.

The composition can also be accommodated between two layers of textiles in a sandwich-like manner. Several layer assemblies can also be assembled one above the other. For example, the configuration can comprise the selectively permeable membrane layer, a substrate layer, another selectively permeable membrane layer, another substrate layer, and so on, depending upon desired applications of the protective structure. Other configurations can comprise variations of the aforementioned sandwich configuration, including a plurality of selectively permeable membrane layers, a plurality of substrate layers, and so forth, including mixtures thereof.

The membrane from the composition can be present as a layer of material added to the protective structure, or as one component of a fabric incorporated into the protective structure. Coated fabrics, used previously as tarpaulins or other covers, may have at least one wear resistant outer layer that generally needs high flexibility, high resistance to marring from wear, abrasion, scuffing, and scratching, high mechanical strength and toughness. Coating compositions preferably exhibit good adhesion to fabrics and other substrates such as plastic films and cellulosic materials such as paper or paperboard. They also desirably exhibit good melt processability, good colorability, good printability, and high transparency and/or gloss. Previous coating compositions for these applications include plasticized or flexible polyvinyl chloride. The composition described herein provides a superior coating composition to previous coating materials because it is selectively permeable.

The composition can be in the form of a film or sheet and the film is mechanically held or fastened in overlaying fashion adjacent to the textile. Mechanical fastening includes the use of fasteners such as snaps, zippers, hook-and-loop fasteners and the like. Mechanical fastening also includes stitching or quilting using threads or fibers.

The selectively permeable membrane may be attached or adhered to the substrate by use of a compatible adhesive placed between the membrane layer and the substrate. To maintain water vapor permeability of the structure, in some embodiments the adhesive is present as a discontinuous layer between the membrane layer and the substrate, and in many cases, it may be applied as a series of adhesive dots that cover for example about 10 to about 40 percent of the substrate surface. The adhesive also may be applied selectively near the edges of the membrane and the substrate.

The selectively permeable membrane may also be attached to the substrate by heat sealing or high frequency (HF) welding. The laminate can be heat sealed (thermally bonded) using any known method, included heated presses and calenders and the like, or by applying heat to the layers and then subsequently pressing them together without additional heat. In each case, the softened layer or component subsequently bonds the film structure to the substrate. In either heat sealing or HF welding, the bonding of the film to the substrate may be continuous across the entire area of the film and substrate or it may be discontinuous. Discontinuous bonding may be accomplished by application of heat or HF radiation to selected portions of the area where the film overlays the substrate.

A selectively permeable composition as described herein can be prepared as a powder with granular sizes of up to 600, alternatively up to 400, alternatively up to 200, μm in size. A powder composition can comprise granules that vary in size from about 100 to about 600 μm. The average particle size in a powder composition can be from about 150 to about 200 μm. The compositions can be milled, pulverized or otherwise processed by methods known in the art to provide a desired particle size suitable for application to a substrate.

The powder can be applied to a substrate by a technique such as powder scattering, wherein the powder is evenly distributed across a working width of a substrate and thereafter melted, smoothed, and cooled to provide a uniform coating of the composition on the substrate.

The laminate can further comprise a layer of adhesion-promoting or contaminant blocking substance that is selectively permeable, which could also be an abrasion resistant polymer, positioned adjacent to the selectively permeable layer. For example, this substance may contain urethane functionality and can be about 2.5 to 12 μm thick. Other polymers that can be used in this layer include a variety of elastomers, reactive materials, and adhesives. Preferably the adhesion promoting polymer layer is present as a film, however, the layer can be a coating or an impregnation of the substrate. This additional adhesion promoting polymer layer is especially useful when the laminate is made by combining the layers of the laminate by thermal pressing, bonding, calendaring and the like. In this case, the layer of abrasion resistant polymer is preferably compatible with the selectively permeable layer so that when the items are thermally pressed they adhere together.

The substrate may be any material providing support, shape, esthetic effect, protection, surface texture, bulk volume, weight, or combinations of two or more thereof to enhance the functionality and handability of the structure.

A substrate can be a vehicle to aid in incorporating the selectively permeable composition or provide mechanical support for the membrane so that permeability is not hindered. Preferably a substrate has water vapor diffusion that is greater than the water vapor diffusion of the selectively permeable membrane so that the water vapor diffusion characteristics of the structure are essentially provided by the selectively permeable composition. That is, the substrate does not substantially affect the passage of water vapor through the layered structure, and for example, may have a measured MVTR of at least 1.8, 4, 5, or even 10, $Kg/m^2/24$ hours.

Any support or substrate meeting these desired characteristics may be used with the selectively permeable composition. Examples include a textile or porous sheet material. Sheets made from synthetic fiber spun fabrics, such as nonwoven textiles, may be used as a textile substrate. Cloth that is woven, knitted or the like is also suitable as a textile substrate. A fabric may comprise flame retardant(s), filler(s), or additive(s) disclosed above.

For example, a fabric may comprise a 50% nylon-50% cotton blend woven fabric (also known as NYCO) such as those by Bradford Dyeing Association, Inc., in Bradford, R.I. A fabric of note is a polyester woven fabric from Millikin and Company (Spartanburg, S.C.).

While the substrate has been described generally as a textile, the substrate can be any other material that is capable of accommodating thereon one or a plurality of layers or accommodating therein a dispersion of the selectively permeable composition.

Cellulosic materials such as paper webs (for example Kraft or rice paper), materials made from synthetic fiber spun fabrics, nonwoven textiles, microporous films, or even perforated films having large percentages of open areas such as perforated PE films, may be used as materials for the substrate(s), for example. These materials may be reinforced with fibers. Microporous films of note may be prepared from polypropylene, polyethylene or combinations thereof. They may be monolayer or multilayer films (for example, three-layer films comprising an inner layer of polypropylene between two outer layers of polyethylene). Microporous films are available from Celgard, LLC, Charlotte, N.C. under the CELGARD tradename.

Suitable polymers for a microporous film are (1) linear ultrahigh molecular weight polyethylene having an intrinsic viscosity of at least 18, preferably 18 to 39, deciliters/gram, (2) linear ultrahigh molecular weight polypropylene having an intrinsic viscosity of at least 6 deciliters/gram, and (3) mixtures of (1) and (2).

The microporous film may include a finely divided, particulate, substantially water-insoluble, inorganic filler, for example a siliceous filler, which is distributed throughout the matrix and which is present in amount 50 to 90%, particularly 50 to 85%, by weight of the film. The filler may be silica, precipitated silica, or silica having an average ultimate particle size of less than 0.1 μm and may occupy 35 to 80% of the total volume of microporous film. Because they have a relatively narrow range of pore sizes, films may be made by extruding a polymeric composition which contains an inorganic filler and a processing oil, e.g. a paraffinic oil, naphthenic oil or aromatic oil, uniformly distributed therein; followed by extraction of the processing oil, e.g. with trichloroethylene. Some films are disclosed, for example, in U.S. Pat. Nos. 4,937,115 and 3,351,495 and films are sold by PPG Industries under the tradename TESLIN.

Specific examples of porous or perforated films include a porous PE film having a porosity of about 55% and a pore size of about 0.25 microns, available under the tradename CELGARD K878 from Hoechst Celanese Corp; a porous PE film available under the tradename MSX 1137P from 3M Co.; and a filled porous PE film available under the designation Van Leer 10× from Van Leer Corp. TESLIN SP7 is a filled porous PE films containing about 60% silica, having a thickness of about 0.18 mm (0.007 inch), a tear strength measured as described above of about 90 g, a porosity of about 65%, an average pore size of about 0.1 micron and a largest pore size of 4 to 10 microns. TESLIN X457 is similar to TESLIN SP7 but is more porous. TESLIN SP10 is similar to TESLIN SP7 but has a thickness of about 0.25 mm (0.010 inch). All three TESLIN films are available from PPG Industries. A perforated high density polyethylene film, 0.11 mm (4.5 mil) thick, with an open area of about 36%, is available under the tradename DELNET from Applied Extrusion Technologies.

A substrate can be a porous sheet material comprising a fluoropolymer. A substrate can be sheet material made with expanded polytetrafluoroethylene that is available from many companies, including W. L. Gore & Associates of Wilmington, Del. Other porous substrates include porous or microporous polyurethane films, certain flash spun non-woven fabrics, such as flash spun polypropylene, and other spun bonded polymer fabrics, filter materials from companies such as Millipore, nano- or micro-fiber structures, natural or synthetic fibers, other related supports that add dimensional stability, or combinations of two or more thereof.

The protective structure may further comprise other layers such as adhesive layers, thermal insulation layers, cushioning layers, absorptive layers, reactive layers, and the like.

Insulation layers and cushioning layers may comprise an organic thermoplastic fiber-based material comprising, e.g., polyester, polyethylene or polypropylene. For example, the thermal insulating or cushioning layer is a fiberfill batt comprising polyester. A fiberfill batt sold as THERMOLITE ACTIVE ORIGINAL by DuPont is suitable. Alternatively, the thermal insulating layer may comprise melt-blown fibers, such as melt-blown polyolefins, sold as THINSULATE, by 3M. They may also include other materials such as fiberglass batts.

The mechanical properties and ease of processing of the selectively permeable composition, and its ability to transport water vapor and block liquids, optionally combined with a support substrate render protective structures thereof applicable for covering or enclosing articles during transport and storage. The structure so made is also referred to as selectively permeable membrane or structure. The mechanical properties and ease of processing of the selectively permeable structure, and its ability to transport water and block organic molecules, combined with a support substrate render protective structures thereof applicable for various applications, such as, for example, chemical and/or biological protective clothing for health care or military applications. Examples include chemical and/or biological protective apparel comprising any of the aforementioned various embodiments of the selectively permeable protective structure. A biological barrier is any structure that provides resistance to harmful or undesirable biological agents such as bacteria, microbes, viruses and the like that, for example, may be present in blood, sera, and other bodily fluids or may be present as aerosols.

The protective structure can be used in protective garments such as for health care applications including gowns and other apparel for operating room, patient visitor, medical, dental, and similar applications. The apparel can be selected, for example, from the group consisting of gowns, aprons, shirts, trousers, overcoats, gloves, shoes, boots, overboots, socks, hoods, hats, caps, masks, and eye goggles. Other health care equipment can be selected, for example, from the group consisting of screens, drapes, and breathable dressings.

Protective garments may also be used in military, food preparation, transportation, industrial and manufacturing procedures other applications that require protection from biological and/or chemical agents, heat, irritants and the like. The unique properties of the selectively permeable structure are useful for applications including protective clothing for "first responders" in chemical threat situations, or for hazardous materials handling. In addition to apparel listed above for health care applications, protective apparel may also include helmets and gas masks.

The selectively permeable protective structure may also be suitable for fabrics used in responding to biological and/or chemical spills. It may be used for fabrics for tents, awnings and other shelters. These uses may be protective, since they block transmission of the agent from one place to another.

Other uses for the selectively permeable structure include covering objects during transportation and storage to provide protection from liquid water while allowing water vapor to permeate out of the enclosed space, preventing a buildup of moisture inside the enclosed space, thereby reducing the possibility of corrosion, mold growth and other deleterious effects resulting from excess moisture.

A variety of structural configurations may be used to produce the covering or package. For example, the variably permeable multilayer structure may be in the form of a flexible sheet of material. The sheet material may be wrapped around an article to be protected from corrosion in the same way conventional plastic films are used. Some structural configurations are as follows.

(1) Films or sheets of material comprising the selectively permeable structure that may be wrapped around or draped over the object(s) being packaged.

For example, the object, which may be a piece of equipment or a pallet and its load, may be wrapped in overlapping layers of film that may be applied by machine or by hand. These films may be relatively long and narrow and dispensed from rolls. The film may be stretchable or heat shrinkable. Wrapping an object with a linear stretch wrapping film by a machine, for example may be done by placing the object on a turntable and rotating it as the film is fed horizontally and its position is varied vertically to wrap the object in overlapping layers. The film may also be applied manually, as by an operator with a hand-held film dispenser who walks around the loaded pallet until a sufficient amount of film is applied.

A heat shrinkable film can be wrapped around an object and heat applied to it so that it shrinks to conform tightly around the object.

Other examples include substantially flat rectangular sheets having similar length and width that may be draped and optionally mechanically fastened in place (for example, with straps, ropes, elastic bands or the like) over the object, such as tarpaulins and the like.

These package forms may be preferred when a large variety of objects of different size and shape are to be packaged at a given time or location.

(2) Bags, pouches, hoods or sheathes comprised completely of the selectively permeable structure described herein or which comprise other materials such as other polymeric materials, woven or nonwoven textiles and the like and have windows, patches or areas thereon which comprise the selectively permeable structure.

These packaging forms are prepared from sheets or films that are formed into a concave shape that can accommodate the object to be packaged.

They include heat shrinkable hoods and pallet stretch hoods. Pallet stretch hoods are elastic sheaths that are stretched to fit over a pallet and its load. The pallet stretch hood then contracts, due to its elastic properties, and the forces of contraction provide integrity and stability to the loaded pallet.

These package forms may be preferred when a large number of objects of similar size and shape are to be packaged at a given time or location.

(3) Rigid or semi-rigid or flexible structures such as tubs, boxes, bins and the like, comprised completely of the selectively permeable structure or comprised in part of other materials having one or more windows of the variably permeable multilayer structure thereon.

(4) Lidding material comprised completely of the selectively permeable structure or comprised in part of other materials having one or more windows of the selectively permeable structure thereon. The lidding material may be used in combination with rigid or semi-rigid or flexible structures such as tubs, boxes, bins and the like to prepare a package comprising the selectively permeable structure.

(5) Patches of the selectively permeable structure over designed openings of packages to provide the desired permeability.

(6) Packages in which the selectively permeable structure is covered by a removable protective cover that allows a user to expose the selectively permeable structure to the environment at an appropriate time. For example, the protective cover may comprise a material with low adhesion to the selectively permeable structure that may be peeled away from the surface of the selectively permeable structure when desired. Alternatively, the cover may be removable material that overlays the selectively permeable structure, but is not adhered to it, in a package. For example, the protective cover may be a lid, flap or patch of protective (such as barrier) material that may be removed when desired. The protective cover may also be placed over a patch or window of the selectively permeable structure in a package.

This form of protective cover may provide extra protection of equipment during rain or other inclement weather, after which the barrier flap is removed to allow for moisture to vent through the selectively permeable membrane.

Numerous variations of these structures are also possible and such structures will become apparent to those skilled in the art upon reading this disclosure.

In the method for limiting damage to an article due to corrosion or mold growth, the article can be wrapped or covered in a selectively permeable protective structure disclosed above and the wrapping or covering may or may not be hermetic.

The following Examples are presented to demonstrate and illustrate, but are not meant to unduly limit the scope of, the invention.

EXAMPLES

MI, the mass rate of flow of a polymer through a specified capillary under controlled conditions of temperature and pressure, was determined according to ASTM 1238 at 190° C. using a 2160 g weight, in g/10 minutes.

For samples with high water permeability (>100 g/m$^2$-24 h), the water vapor transmission tests were conducted on a Mocon PERMATRAN-W 101K, following ASTM D6701-01, at 37.8° C. at 100% relative humidity. For the other samples, the transmission tests were conducted on a Mocon PERMATRAN-W 700, following ASTM F1249-01. Moisture vapor permeation values (MVPV) on film samples are reported in g-mil/m²·24 h while MVTR are reported in g/m²·24 h. The compositions had MVPV of at least 800 (or at least 1200) g-mil/m²/24 h.

Another method for determining material "breathability," or evaporative resistance, uses a Guarded Sweating Hotplate Test according to ASTM F1868, ISO 11092.

Moisture Vapor Transmission Rate (MVTR) of Multilayer Structure

This is measured by a method derived from the Inverted Cup method of MVTR measurement [ASTM E 96 Procedure BW, Standard Test Methods for Water Vapor Transmission of Fabrics (ASTM 1999)]. A vessel with an opening on top is charged with water and the opening is covered first with a moisture vapor permeable (liquid impermeable) layer of expanded-PTFE film ("ePTFE"), and then with the sample for which the MVTR is to be measured, and finally by woven fabric overlayer [NYCO 50:50 nylon/cotton blend, 6.7 oz/yd² (0.23 kg/m²) treated with durable water repellant finish]. The three layers are sealed in place, inverted for 30 minutes to condition the layers, weighed to the nearest 0.001 g, and then contacted with a dry stream of nitrogen while inverted. After 19 h at 23° C., the sample is reweighed and the MVTR calculated (kg/m²·24 h) by means of the following equation:

$$MVTR = 1/[(1/MVTR_{obs}) - (1/MVTR_{mb})]$$

where $MVTR_{obs}$ is the observed MVTR of the experiment and $MVTR_{mb}$ is the MVTR of the ePTFE moisture barrier (measured separately). The values are the average of results from three replicate samples.

In order to illustrate the moisture permeance associated with a film layer involving a selectively permeable composition as described herein, extrusion cast films were prepared from the materials listed below. The selectively permeable composition was also extrusion coated onto substrates to illustrate its adhesion to the substrates.

Thermoplastic compositions are polymeric materials that can flow when heated under pressure. Melt index (MI) is the mass rate of flow of a polymer through a specified capillary under controlled conditions of temperature and pressure. Melt indices reported herein are determined according to ASTM 1238 at 190° C. using a 2160 g weight, with values of MI reported in grams/10 minutes.

Materials Used

EAC-1: an ethylene/methacrylic acid dipolymer with 19 weight % of methacrylic acid, having MI of 395 g/10 min.

EAC-2: a terpolymer comprising ethylene, n-butyl acrylate (28 weight %) and acrylic acid (6.2 weight %), having MI of 200 g/10 min.

EAC-3: a terpolymer of ethylene, n-butyl acrylate (23.5 weight %) and methacrylic acid (9 weight %), having an MI of 200 g/10 min.

EAC-5: a terpolymer of ethylene, n-butyl acrylate (15.5 weight %) and acrylic acid (8.5 weight %), having an MI of 60 g/10 min.

EAC-6: a terpolymer of ethylene, n-butyl acrylate (15.5 weight %) and acrylic acid (10.5 weight %), having an MI of 60 g/10 min.

ABA: A mixture containing 90 weight % of a mixture of arachidic acid and behenic acid with 6 weight % $C_{18}$ acids and 4 weight % other acids commercially available under the tradename HYSTRENE® 9022 from Chemtura.

EMA-1: An ethylene/methyl acrylate copolymer with 24 weight % methyl acrylate with MI of 20 g/10 min.

EBA-1: An ethylene/butyl acrylate copolymer with 35 weight % butyl acrylate, having melt index of 40 g/10 min.

EBA-2: An ethylene/butyl acrylate copolymer with 27 weight % butyl acrylate, having melt index of 4 g/10 min.

Mod-1: a blend of EAC-2 and 5 weight % ABA wherein 93% of the combined carboxylic acid groups in the terpolymer and the ABA were neutralized to potassium salts.

EMA-2: An ethylene/methyl acrylate copolymer with 20 weight % methyl acrylate with MI of 8 g/10 min.

Ionomer I-1: a terpolymer comprising ethylene, n-butyl acrylate (23.5 weight %) and methacrylic acid (9 weight percent), neutralized to 52% with sodium using sodium hydroxide, with MI of 1.

Employing a Werner & Pfleiderer twin-screw extruder, a mixture of EAC-1 and ABA was neutralized to 93-95% with a masterbatch of potassium hydroxide in EMA-1 to a neutralization level of 93-95% to provide Composition A. The weight ratios of the polymeric materials are summarized in Table 1. A portion of Composition A was further neutralized with neat potassium hydroxide to provide Composition B.

TABLE 1

|  | Parts by weight | | | % Nominal |
|---|---|---|---|---|
|  | EAC-1 | ABA | EMA-1 | Neutralization |
| Composition A | 73.2 | 18.4 | 8.4 | 93-95 |
| Composition B | 73.2 | 18.4 | 8.4 | 106 |

Composition A was extrusion coated at 0.8 mil thickness onto polypropylene nonwoven textile (PP NW) and 50-pound Kraft paper substrate sheets using an Egan extrusion coating machine equipped with a matte-surface chill roll, an Edlon®/Teflon®-covered pressure roll, corona treater and a Cloeren EBR 40-inch die. The substrates were corona treated at 3 KW/ft². The machine settings included a 6 inches air gap and 80 psi nip roll pressure. Adhesion was tested by T-peel test according to ASTM2234-95. The adhesion peel strength between the coating and the substrate are summarized in Table 2. In the Tables, the abbreviations indicate as follows: "p"=peels, "d"=delaminates, "ft"=fiber tear, "fp"=fiber peel and "t"=tears. These runs show low adhesion of Composition A to the nonwoven textile under the conditions indicated.

TABLE 2

| Substrate | Extrusion Temp (° C.) | Feet/min | Chill roll Temp (° C.) | Adhesion peel strength | Comments |
|---|---|---|---|---|---|
| PP NW | 375 | 235 | 69 | 7 g/in | p |
| Kraft | 375 | 235 | 69 | 115 g/in | p |
| PP NW | 375 | 400 | 71 | 10 g/in | p |
| Kraft | 375 | 400 | 71 | 203 g/in | fp |
| PP NW | 400 | 235 | 73 | 8 g/in | p |
| Kraft | 400 | 235 | 73 | 230 g/in | fp |
| PP NW | 400 | 400 | 76 | 9 g/in | p |
| Kraft | 400 | 400 | 76 | 316 g/in | fp, ft |

Composition A was blended with 30 weight % of EMA-2 and then extrusion coated at 375° F. and 0.8 mil thickness onto polypropylene nonwoven textile (PP NW) and 24-pound Kraft paper substrate sheets, using similar conditions as those above. These runs show low adhesion of Composition A modified with an ethylene/methyl acrylate copolymer to the nonwoven textile under the conditions indicated.

TABLE 3

| Substrate | Extrusion Temp (° C.) | Feet/min | Adhesion Peel strength (g/in) | Comments |
|---|---|---|---|---|
| PP NW | 370 | 235 | 10 | p |
| Kraft | 370 | 235 | 178 | fp, p |
| PP NW | 370 | 400 | 7 | p |
| Kraft | 370 | 400 | 137 | fp, p |

Similarly, Composition A was melt blended with the polyethylenes listed and EAC-2 to provide compositions containing 35 weight % of Composition A, 10 weight % of EAC-2 and 55 weight % of polyethylene; 30 weight % of Composition A, 15 weight % of EAC-2 and 55 weight % of polyethylene; 30 weight % of Composition A, 15 weight % of EAC-2 and 50 weight % of polyethylene; 40 weight % of Composition A, 10 weight % of EAC-2 and 50 weight % of polyethylene; or 45 weight % of Composition A, 10 weight % of EAC-2 and 45 weight % of polyethylene.

In order to assess adhesion of compositions wherein Composition A or B were modified with various polymers, the following tests were performed. Using a Werner & Pfleiderer twin-screw extruder, the Compositions A and B were melt blended with additional materials to provide the compositions summarized in Table 4. The compositions in Table 4 were processed into 2-mil-thick cast films.

For the film samples, water vapor permeation tests were conducted on a Mocon Permatran-W® 101K, following ASTM D6701-01, at 37.8° C. Water vapor permeation values (WVPV) on film samples are reported in g-mil/m$^2$-24 h while moisture vapor transmission rates (MVTR) are reported g/m$^2$-24 h.

TABLE 4

| | Weight % | | | | | | WVTR |
|---|---|---|---|---|---|---|---|
| Example | Composition A | Composition B | EBA-1 | EAC-2 | Mod-1 | I-1 | mil-g/M$_2$-day |
| C1 | 100 | 0 | 0 | 0 | 0 | 0 | 12721 |
| 2 | 90 | 0 | 10 | 0 | 0 | 0 | 10193 |
| 3 | 80 | 0 | 20 | 0 | 0 | 0 | 2910 |
| 4 | 70 | 0 | 30 | 0 | 0 | 0 | 1376 |
| 5 | 90 | 0 | 5 | 5 | 0 | 0 | 7934 |
| 6 | 80 | 0 | 10 | 10 | 0 | 0 | 6666 |
| 7 | 70 | 0 | 15 | 15 | 0 | 0 | 2657 |
| 8 | 90 | 0 | 0 | 10 | 0 | 0 | 6663 |
| 9 | 80 | 0 | 0 | 20 | 0 | 0 | 4019 |
| 10 | 70 | 0 | 0 | 30 | 0 | 0 | 1558 |
| C11 | 0 | 100 | 0 | 0 | 0 | 0 | 13102 |
| 12 | 0 | 90 | 0 | 10 | 0 | 0 | 8793 |
| 13 | 0 | 80 | 0 | 20 | 0 | 0 | 4445 |
| 14 | 0 | 70 | 0 | 30 | 0 | 0 | 2102 |
| 15 | 0 | 90 | 0 | 0 | 10 | 0 | 8602 |
| 16 | 0 | 80 | 0 | 0 | 20 | 0 | 5947 |
| 17 | 0 | 70 | 0 | 0 | 30 | 0 | 4685 |
| 18 | 0 | 90 | 0 | 0 | 0 | 10 | 8464 |
| 19 | 0 | 80 | 0 | 0 | 0 | 20 | 6507 |
| 20 | 0 | 70 | 0 | 0 | 0 | 30 | 4446 |

The physical properties of some of the films are summarized in Table 5. To assess adhesion of the compositions to a polypropylene nonwoven textile substrate, the films were heat sealed between two layers of substrate at 325° F. at 40 psi for 1.0 sec to provide a 3-layer structure of PP nonwoven/film/PP nonwoven.

TABLE 5

| | Tensile modulus, psi | | | Elmendorf Tear, g/mil | | | Tensile strength, psi | | | Elongation at break, % | | |
|---|---|---|---|---|---|---|---|---|---|---|---|---|
| Example | MD | TD | ave | MD | TD | ave | MD | TD | ave | MD | TD | ave |
| C1 | 25400 | 18300 | 21850 | 9.07 | 20.6 | 14.84 | 1600 | 1100 | 1350 | 290 | 149 | 220 |
| 2 | 21200 | 17600 | 19400 | 10 | 24.5 | 17.25 | 1730 | 1140 | 1435 | 451 | 321 | 386 |
| 3 | 19700 | 18000 | 18850 | 12.62 | 22.13 | 17.38 | 1550 | 880 | 1215 | 483 | 247 | 365 |
| 4 | 15700 | Film tear | NA | 1.77 | 4.38 | 3.08 | 1300 | film tear | NA | 435 | NA | NA |
| 5 | 20800 | 20100 | 20450 | 16.57 | 26.34 | 21.46 | 1570 | 1330 | 1450 | 388 | 386 | 387 |
| 6 | 16400 | 15100 | 15750 | 22.39 | 53.4 | 37.90 | 1760 | 1220 | 1490 | 539 | 414 | 476 |
| 7 | 13700 | 11100 | 12400 | 40.51 | 77 | 58.76 | 1600 | 1050 | 1325 | 534 | 386 | 460 |
| 8 | 19600 | 18900 | 19250 | 20.5 | 21.42 | 20.96 | 1790 | 1370 | 1580 | 487 | 376 | 432 |
| 9 | 16800 | 14900 | 15850 | 54.05 | 73.89 | 63.97 | 1820 | 1630 | 1725 | 542 | 518 | 530 |
| 10 | 13200 | 14400 | 13800 | 95.65 | 154.83 | 125.24 | 1790 | 1452 | 1621 | 560 | 507 | 534 |

The adhesion was tested by the T-peel test and reported in Table 6.

TABLE 6

| | T-peel Strength | | | |
|---|---|---|---|---|
| | lbf/in | | gm/in | |
| Example | Average | Standard deviation | Average | Standard deviation |
| C1 | 1.267 | 0.691 | 652 | 314 |
| 2 | 1.544 | 0.708 | 799 | 321 |
| 3 | 0.823 | 0.432 | 427 | 196 |
| 4 | 1.229 | 0.423 | 633 | 192 |
| 5 | 1.436 | 0.758 | 708 | 344 |
| 6 | 1.812 | 0.662 | 928 | 301 |
| 7 | 1.528 | 0.579 | 787 | 263 |
| 8 | 2.048 | 0.573 | 1023 | 260 |
| 9 | 1.534 | 0.37 | 756 | 168 |
| 10 | 1.433 | 0.394 | 725 | 179 |
| C11 | 1.12 | 0.235 | 508 | 107 |
| 12 | 1.835 | 0.27 | 832 | 122 |
| 13 | 1.789 | 0.057 | 811 | 26 |
| 14 | 1.283 | 0.071 | 582 | 32 |
| 15 | 0.769 | 0.173 | 349 | 78 |
| 16 | 0.996 | 0.456 | 452 | 207 |
| 17 | 1.29 | 0.553 | 585 | 251 |
| 18 | 1.085 | 0.284 | 492 | 129 |
| 19 | 0.889 | 0.317 | 403 | 144 |
| 20 | 1.003 | 0.31 | 455 | 141 |

Compositions modified with EAC-2, an ethylene/acrylic acid/n-butyl acrylate terpolymer, showed better adhesion to PP nonwoven in these tests compared to unmodified compositions or compositions modified with ethylene/alkyl acrylate dipolymers. Compositions in which the ethylene/acrylic acid/n-butyl acrylate terpolymer was in the form of an ionomer prior to blending did not exhibit improved adhesion (Examples 15-20).

Compositions were prepared as summarized in Table 7 and were extrusion coated onto polypropylene nonwoven textile (PP NW), polyethylene/polyethylene terephthalate nonwoven textile (PE/PET NW) and 50-pound Kraft paper sheets at around 200 feet/minute, using an similar conditions as those described above.

TABLE 7

| Example | Composition A | EBA-2 | EMA-1 | EAC-2 |
|---|---|---|---|---|
| 21 | 70 | 30 | 0 | 0 |
| 22 | 70 | 0 | 30 | 0 |
| 23 | 90 | 0 | 0 | 10 |

The extrusion-coating runs are summarized in Table 8.

TABLE 8

| Example | Composition | Thickness (mil) | Substrate | Extrusion Temperature (° C.) | Corona Treatment (Kw/ft$^2$) | Chill roll (° C.) |
|---|---|---|---|---|---|---|
| 24 | Example 21 | 0.8 | PP NW | 400 | 3 | 74 |
| 25 | Example 21 | 0.8 | Kraft | 400 | 3 | 74 |
| 26 | Example 21 | 1.0 | PP NW | 420 | 6 | 80 |
| 27 | Example 21 | 1.0 | Kraft | 420 | 6 | 80 |
| 28 | Example 21 | 1.0 | PE/PET NW | 420 | 6 | 86 |
| 29 | Example 21 | 1.0 | Kraft | 420 | 6 | 86 |
| 30 | Example 22 | 1.0 | PP NW | 420 | 6 | 95 |
| 31 | Example 22 | 1.0 | Kraft | 420 | 6 | 95 |
| 32 | Example 23 | 1.0 | PP NW | 420 | 6 | 77 |
| 33 | Example 23 | 1.0 | Kraft | 420 | 6 | 77 |
| 34 | Example 23 | 1.0 | PE/PET NW | 415 | 4 | 101 |
| 35 | Example 23 | 1.0 | PE/PET NW | 415 | 4 | 101 |
| 36 | Example 23 | 1.0 | PP NW | 450 | 4 | 111 |
| 37 | Example 23 | 1.0 | Kraft | 450 | 4 | 111 |

For the runs in which the substrate was a polypropylene nonwoven, WVTR was measured on the coating after peeling it from the substrate. For the runs in which the substrate was Kraft paper or PE/PET nonwoven, WVTR was measured on the entire 2-layer structure.

TABLE 9

| Example | Adhesion peel strength (g/inch) | Comments | WVTR[1] |
|---|---|---|---|
| 24 | 0.1 | p | 1938 |
| 25 | 62 | p | 1063 |
| 26 | 0.3 | p | 2479 |
| 27 | 13 | p | 856 |
| 28 | 0.5 | p | NA |
| 29 | 124 | p, fp | 627 |
| 30 | 29 | p, t | 1889 |
| 31 | 79 | p, fp | 1175 |
| 32 | 0.7 | p | 3760 |
| 33 | 208 | fp | 1140 |
| 34 | 473 | (p, d, fp, t)[2] | 3774 |
| 35 | 633 | (p, fp)[3] | |
| 36 | 17 | p | 3301 |
| 37 | 78 | p, d | 1652 |

[1]In g/[m$^2$-day].
[2]Inside of roll.
[3]Outside of roll.

Composition A modified with 10 wt % EAC-2, an ethylene acrylic acid n-butyl acrylate terpolymer, showed good adhesion to Kraft paper and excellent adhesion to PE/PET NW. These results are superior to those obtained when Composition A was modified with 30 weight % EBA-1, an ethylene/n-butyl acrylate dipolymer. The composition containing EAC-2 also had higher WVTR, showing it retained more moisture permeability from Composition A.

The invention claimed is:

1. An article comprising a selectively permeable structure wherein the structure comprises a composition comprising (a), (b), and optionally (c);
   (a) is a combination comprising (i) and (ii), wherein (i) is one or more ethylene acid copolymers; and (ii) is one or more organic acids; wherein at least 50% of the combined acidic groups in the acid copolymer and the organic acid are nominally neutralized to salts with metal ions and at least 50% of the metal ions are alkali metal ions;
   (b) is a terpolymer of ethylene, acrylic acid or methacrylic acid, and an alkyl acrylate or alkyl methacrylate; and
   (c) is one or more ethylene-containing polymers selected from the group consisting of polyethylene homopolymers, copolymers of ethylene and an α-olefin, copolymers of ethylene and a diolefin, and ethylene copolymers obtained from copolymerization of ethylene with at least one polar monomer selected from the group consisting of vinyl acetate, acrylic ester, methacrylic ester and carbon monoxide, wherein the ethylene-containing polymer does not comprise a carboxylic acid comonomer.

2. The article of claim 1 wherein the article is selectively permeable to moisture having a moisture vapor transmission rate, measured according to ASTM F2298, of at least 1800 g/m$^2$/24 h.

3. The article of claim 1 wherein at least 80% of the combined acidic groups in the acid copolymer and the organic acid are neutralized to salts with alkali metal ions.

4. The article of claim 2 wherein the article has moisture vapor transmission rate of at least 4 Kg/m$^2$/24 hours; and at least 80% of the combined acidic groups of the combined acidic groups in the acid copolymer and the organic acid are neutralized to salts with alkali metal ions.

5. The article of claim 4 wherein the alkali metal ion is preponderantly potassium ions.

6. The article of claim 4 wherein the alkali metal ion is preponderantly potassium ions and the article has moisture vapor transmission rate of at least 10 Kg/m$^2$/24 hours.

7. The article of claim 1 wherein the composition comprises
   (a) 30 to 99 weight %, based on the combination of (a), (b) and (c), of a blended combination of
      (1) 70 to 90 weight %, based on the combination of (1) and (2), of one or more E/W ethylene acid copolymers or ionomers of the acid copolymers wherein E represents copolymerized units of ethylene, W is present in about 2 to about 35 weight % of the copolymer and represents copolymerized units of at least one $C_3$ to $C_8$ α,β-ethylenically unsaturated carboxylic acid;
      (2) 10 to 30 weight %, based on the combination of (1) and (2), of one or more organic acids having from 4 to 36 carbon atoms, or salts thereof; wherein at least 50% of the combined acidic groups in the E/W copolymer and the organic acid are nominally neutralized to salts with metal ions; wherein at least 50% of the metal ions are alkali metal ions;
   (b) 1 to 30 weight %, based on the combination of (a), (b) and (c), of E/X/Y ethylene acid terpolymers wherein E represents copolymerized units of ethylene, X is present in about 2 to about 35 weight % of the copolymer and represents copolymerized units of acrylic acid or methacrylic acid, and Y is present in about 1 to about 35 weight % of the copolymer and represents copolymerized units of alkyl acrylate or alkyl methacrylate; and
   (c) 0 to 60 weight %, based on the combination of (a), (b) and (c), of one or more second ethylene-containing polymer selected from the group consisting of polyethylene homopolymers, copolymers of ethylene and an α-olefin, copolymers of ethylene and a diolefin, and ethylene copolymers obtained from copolymerization of ethylene with at least one polar monomer selected from the group consisting of vinyl acetate, acrylic ester, methacrylic ester and carbon monoxide, wherein the second ethylene-containing polymer does not comprise a carboxylic acid comonomer; wherein (a), (b) and (c) total 100 weight %.

8. An article comprising or produced from a composition according to claim 1 and a substrate wherein the substrate or a portion thereof is coextruded, impregnated, incorporated, laminated embedded or coated with the composition.

9. The article of claim 8 wherein the substrate comprises textile or porous sheet material; and the substrate is coated with the composition.

10. The article of claim 8 wherein the article is a monolithic or continuous membrane and the substrate is porous film, flash spun nonwoven fabrics, woven fabrics of synthetic fiber, natural fiber, scrim, paper, filter material, or combinations of two or more thereof.

11. The article of claim 10 wherein the substrate is flash spun nonwoven fabric comprising polyethylene, polypropylene, polyester or combinations thereof, woven fabrics of synthetic fibers, natural fiber, or combinations of two or more thereof.

12. The article of claim 8 further comprises a layer including fabrics of aramid, glass fiber, or combinations thereof.

13. The article of claim 8 wherein the substrate is paper, fabric, apparel, garment or covering, or combinations of two or more thereof and the garment or the covering is for hospital patient visitor, hospital operating room, medical application, or dental application.

14. The article of claim 8 further comprising a layer including fabrics of aramid, glass fiber, or combinations thereof and the substrate optionally comprises one or more apertures, voids, or gaps throughout which the composition is dispersed.

15. The article of claim 8 wherein the article provides a protective article used in protection from biological agent, chemical agent, irritant, or combinations of two or more thereof.

16. The article of claim 8 wherein the article includes one or more gowns, aprons, shirts, trousers, overcoats, gloves, shoes, boots, overboots, socks, hoods, hats, caps, masks, eye goggles, drapes, tents, shelters, tarpaulins, helmets, breathable dressings, films, sheets, bags, pouches, sheathes, tubs, boxes, bins, lidding material, or packages.

17. A method for limiting damage to an article due to corrosion or mold growth, comprising wrapping or covering the article in a selectively permeable protective structure according to claim 1.

18. The method of claim 17 wherein selectively permeable protective structure comprises a substrate wherein the substrate or a portion thereof is coextruded, impregnated, incorporated, laminated embedded or coated with the composition.

19. The method of claim 18 wherein the substrate comprises textile or porous sheet material; and the substrate is coated with the composition.

20. The method of claim 18 wherein the article is a monolithic or continuous membrane and the substrate is porous film, flash spun nonwoven fabrics, woven fabrics of synthetic fiber, natural fiber, scrim, paper, filter material, or combinations of two or more thereof.

\* \* \* \* \*